(12) United States Patent
Savagian et al.

(10) Patent No.: US 8,860,348 B2
(45) Date of Patent: Oct. 14, 2014

(54) METHOD AND APPARATUS FOR CONTROLLING A HIGH-VOLTAGE BATTERY CONNECTION FOR HYBRID POWERTRAIN SYSTEM

(75) Inventors: Peter J. Savagian, Bloomfield Hills, MI (US); Sean E. Gleason, West Bloomfield, MI (US); James E. Tarchinski, Rochester Hills, MI (US); Mohammad N. Anwar, Van Buren Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 878 days.

(21) Appl. No.: 12/874,551

(22) Filed: Sep. 2, 2010

(65) Prior Publication Data

US 2012/0056567 A1    Mar. 8, 2012

(51) Int. Cl.
*H02P 7/00* (2006.01)
*B60L 11/00* (2006.01)
*B60L 11/12* (2006.01)
*B60L 11/14* (2006.01)
*B60L 7/14* (2006.01)
*B60K 6/20* (2007.10)
*B60W 20/00* (2006.01)

(52) U.S. Cl.
CPC .............. *B60L 11/14* (2013.01); *B60L 11/005* (2013.01); *Y02T 10/6217* (2013.01); *Y02T 10/642* (2013.01); *Y02T 10/7022* (2013.01); *B60L 11/123* (2013.01); *Y02T 10/7005* (2013.01); *B60K 6/20* (2013.01); *B60W 2510/244* (2013.01); *B60L 2240/423* (2013.01); *B60W 2710/083* (2013.01); *Y02T 10/7077* (2013.01); *B60L 2240/443* (2013.01); *B60L 2210/40* (2013.01); *B60W 20/00* (2013.01); *Y02T 10/7241* (2013.01); *B60L 2240/441* (2013.01); *B60L 7/14* (2013.01); *B60L 2220/14* (2013.01)
USPC .... 318/432; 318/111; 318/400.26; 318/400.3

(58) Field of Classification Search
USPC ................. 318/111, 400.3, 400.26, 722, 432; 180/65.21, 65.23, 65.285, 65.29, 65.6; 363/71, 127, 128, 131; 320/1, 2, 103, 320/166, 127, 137
See application file for complete search history.

(56) References Cited

U.S. PATENT DOCUMENTS

| | | | |
|---|---|---|---|
| 5,373,195 A | | 12/1994 | DeDoncker et al. |
| 6,048,289 A | * | 4/2000 | Hattori et al. |
| 7,135,835 B2 | | 11/2006 | Yamada et al. |
| 7,176,648 B2 | * | 2/2007 | Choi |
| 7,538,449 B2 | | 5/2009 | Schreiber |
| 8,110,948 B2 | * | 2/2012 | Su |
| 8,169,177 B2 | * | 5/2012 | Kishimoto |
| 8,281,886 B2 | * | 10/2012 | Saha et al. |
| 2004/0145338 A1 | * | 7/2004 | Nakamura et al. |
| 2007/0171689 A1 | * | 7/2007 | Ishikawa et al. ................. 363/71 |
| 2009/0058326 A1 | * | 3/2009 | Oyobe et al. |
| 2011/0095603 A1 | * | 4/2011 | Lee et al. |
| 2011/0115416 A1 | * | 5/2011 | Oh et al. ........................ 318/139 |

* cited by examiner

*Primary Examiner* — Bentsu Ro
*Assistant Examiner* — Thai Dinh

(57) ABSTRACT

A hybrid powertrain system has a high-voltage electric circuit including a high-voltage battery and a DC link coupled to first and second inverters electrically connected to first and second torque machines. A method for operating the hybrid powertrain system includes receiving a motor torque command for the second torque machine, determining a preferred DC link voltage for achieving the motor torque commanded from the second torque machine, selectively interrupting electric power flow between the high-voltage battery and the DC link to achieve the preferred DC link voltage.

16 Claims, 4 Drawing Sheets

METHOD AND APPARATUS FOR CONTROLLING A HIGH-VOLTAGE BATTERY CONNECTION FOR HYBRID POWERTRAIN SYSTEM

TECHNICAL FIELD

This disclosure is related to high-voltage electrical systems for vehicles, including powertrain systems.

BACKGROUND

The statements in this section merely provide background information related to the present disclosure and may not constitute prior art.

Known vehicle systems use hybrid powertrain architectures to generate at least a portion of required tractive torque originating from a non-hydrocarbon-fueled motor, including an electric machine that transforms electric power to mechanical torque. Powertrain architectures may be configured to transfer tractive torque to an output member through a transmission device. Such powertrain architectures can include series-hybrid configurations, parallel-hybrid configurations, and compound-split hybrid configurations. Electric machines operative as both motors and generators can be controlled to generate torque inputs to the transmission independently of a torque input from the internal combustion engine. The electric machines may react and transform vehicle kinetic energy transmitted through the vehicle driveline to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage torque and rotational speed outputs of the transmission.

Known electrical circuits for providing electric power to electric machines include a high-voltage DC electrical energy storage device that supplies DC electric power via a high-voltage bus through a DC link to an inverter which transforms the DC electric power to AC electric power to power the electric machine. The electric machine is preferably a multiphase synchronous AC machine including a stator and a rotor magnetically coupled to the stator.

Performance of an electric machine, specifically generation of torque for either propulsion or reaction associated with regenerative braking, is constrained by magnitude of the DC voltage at the DC link to the inverter.

The series path power capability to and from the high-voltage DC bus is limited by a magnitude of voltage at the DC link to the inverter, which affects mechanical power output from the electric machine connected thereto. The magnitude of voltage at the DC link to the inverter can be constrained by magnitude of the DC voltage available from the high-voltage DC electrical energy storage device that is transferred to and from the high-voltage DC electrical energy storage device.

A known solution for increasing the magnitude of voltage at the DC link to the inverter includes using a high-voltage DC electrical energy storage device having a greater voltage level than the high-voltage DC electrical energy storage device. Another known method for increasing the magnitude of voltage at the DC link to the inverter includes adding a DC/DC boost converter between the high-voltage DC electrical energy storage device and the DC link to the inverter. Another known method for increasing the magnitude of voltage at the DC link to the inverter includes adding an ultracapacitor bank to the DC link for the inverter. Each of these known solutions utilizes packaging space in the vehicle, adds weight, and increases complexity of the electrical system.

SUMMARY

A hybrid powertrain system has a high-voltage electric circuit including a high-voltage battery and a DC link coupled to first and second inverters electrically connected to first and second torque machines. A method for operating the hybrid powertrain system includes receiving a motor torque command for the second torque machine, determining a preferred DC link voltage for achieving the motor torque commanded from the second torque machine, selectively interrupting electric power flow between the high-voltage battery and the DC link to achieve the preferred DC link voltage.

BRIEF DESCRIPTION OF THE DRAWINGS

One or more embodiments will now be described, by way of example, with reference to the accompanying drawings, in which.

DETAILED DESCRIPTION

Figure 1:
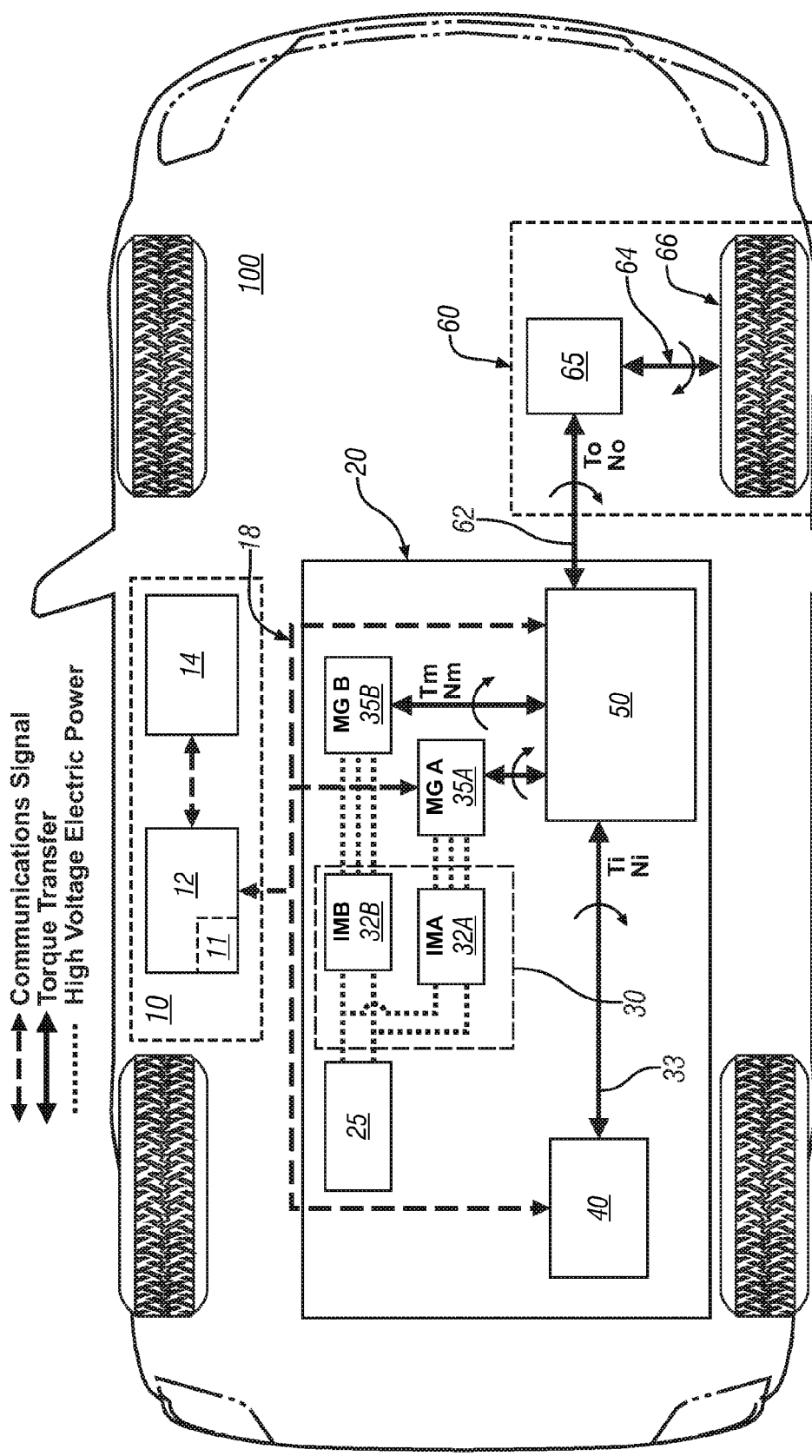
FIG. 1 schematically shows a diagram of a vehicle including a hybrid powertrain system having an engine, hybrid transmission, torque machine, and a driveline, in accordance with the present disclosure.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. Like numerals refer to like elements throughout the description. The hybrid powertrain system 20 includes a mechanical power path that includes an engine 40 and first and second electrically-powered torque machines (MG A) 35A and (MG B) 35B that mechanically couple to a hybrid transmission 50 having an output member 62 that couples to the driveline 60. A high-voltage electrical circuit includes a high-voltage battery 25 that electrically connects to an inverter module 30 via a high-voltage bus 29. The inverter module 30 includes first and second electric power inverters 32A and 32B, respectively.

The engine 40 is preferably a multi-cylinder direct fuel injection internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. In one embodiment, the engine 40 is configured to operate as a spark-ignition engine with timing of combustion and the associated engine torque being controlled by advancing or retarding spark ignition timing.

Alternatively, the engine 40 is configured to operate as a compression-ignition engine with timing of combustion and the associated engine torque controlled by advancing or retarding timing of fuel injection events.

The first and second torque machines 35A and 35B preferably include multi-phase electric motor/generators configured to convert stored electric energy to mechanical power and convert mechanical power to electric energy that can be stored in the high-voltage battery 25.

The transmission 50 preferably includes one or more differential gear sets and activatable clutch components to effect torque transfer over a range of speeds among the engine 40, the first and second torque machines 35A and 35B, and an output member 62 coupled to a vehicle driveline 60.

The driveline 60 can include a differential gear device 65 that mechanically couples to an axle 64 or half-shaft that mechanically couples to a wheel 66 in one embodiment. The differential gear device 65 is also coupled to the output member 62 of the hybrid powertrain system 20. The driveline 60 transfers tractive power between the hybrid transmission 50 and a road surface.

Mechanical power originating in the engine 40 may be transferred via an input member 33 to the first torque machine 35A and to the output member 62 via the hybrid transmission 50. Mechanical power originating in the first torque machine 35A may be transferred to the engine 40 via the input member 33 and to the output member 62 via the hybrid transmission 50. Mechanical power originating in the second torque machine 35B may be transferred via the hybrid transmission 50 to the output member 62. Mechanical power can be transferred between the hybrid transmission 50 and the driveline 60 via the output member 62. Operating parameters associated with such mechanical power transfer include output torque $T_O$ and output speed $N_O$.

The high-voltage battery 25 stores potential electric energy and is electrically connected via a high-voltage bus 29 including a positive side 29A and a negative side 29B to the inverter module 30 that connects to the first and second torque machines 35A and 35B to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge, temperature, available voltage, and available battery power, each of which is monitored by the control system 10. The available battery power describes battery power limits that include an allowable range between a minimum and maximum allowable battery power, described as a maximum charge power (Pbat-Max Charge) and a maximum discharge power (Pbat-Max Discharge). It is appreciated that the battery power is measured in terms of a parameter that can be regularly monitored, e.g., the state-of-charge (SOC) or another suitable parameter. The allowable battery power limits are preferably established at threshold levels to prevent either overcharging or overdischarging of the high-voltage battery 25, which can result in service life reduction thereof.

The inverter module 30 includes first and second inverters (IMA) 32A and (IMB) 32B that electrically connect to the first and second torque machines 35A and 35B, respectively. The first and second torque machines 35A and 35B interact with the respective first and second inverters 32A and 32B to convert stored electric energy to mechanical power and convert mechanical power to electric energy that can be stored in the high-voltage battery 25. It is appreciated that the first and second electric power inverters 32A and 32B are operative to transform high voltage DC electric power to high-voltage AC electric power and also operative to transform high voltage AC electric power to high-voltage DC electric power. Electric power originating in the first torque machine 35A may be transferred electrically to the high-voltage battery 25 via the inverter module 30 and the high-voltage bus 29 and to the second torque machine 35B via the inverter module 30. Electric power originating in the second torque machine 35B may be transferred electrically to the high-voltage battery 25 via the inverter module 30 and the high-voltage bus 29 and to the first torque machine 35A via the inverter module 30. Additional details related to an exemplary inverter module 30 are provided with reference to FIG. 2 and the associated description.

The control system 10 includes a control module 12 that is signally connected to an operator interface 14. The control module 12 includes a low-voltage electric power supply to provide regulated electric power thereto. It is appreciated that there is a plurality of human/machine interface devices through which the vehicle operator commands operation of the vehicle 100, including, e.g., an ignition switch to enable an operator to crank and start the engine 40, an accelerator pedal, a brake pedal, and a transmission range selector (PRNDL). Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary circuits that are separate and distinct from the control module 12. It is appreciated that information transfer to and from the control module 12 can be accomplished using one or more communications paths, e.g., communications bus 18, which can include one or more of a direct connection, a local area network bus, and a serial peripheral interface bus.

The control module 12 preferably signally and operatively connects to individual elements of the hybrid powertrain system 20 via the communications bus 18. The control module 12 signally connects to the sensing devices of each of the high-voltage battery 25, the inverter module 30, the first and second torque machines 35A and 35B, the engine 40, and the hybrid transmission 50 to monitor operation and determine parametric states thereof.

Monitored parametric states of the engine 40 preferably include engine speed (Ni), engine torque (Ti) or load, and temperature. Monitored parametric states of the hybrid transmission 50 preferably include rotational speed, and hydraulic pressure at a plurality of locations, from which parametric states including application of specific torque transfer clutches can be determined Monitored parametric states of the torque machine(s) 35 preferably include rotational speeds $N_A$ and $N_B$ for the respective first and second torque machines 35A and 35B. Monitored parametric states of the torque machine(s) preferably include power flow(s), e.g., electric current flow, from which a parametric state for motor torques $T_A$ and $T_B$, respectively can be determined Monitored parametric states of the high-voltage battery 25 include battery power and battery temperature.

The control module 12 operatively connects to the actuators of each of the inverter module 30 including the first and second inverters 32A and 32B, the engine 40, and the hybrid transmission 50 to control operation thereof in accordance with executed control schemes that are stored in the form of algorithms and calibrations. It is appreciated that each of the first and second inverters 32A and 32B transforms electric power in a manner suitable for generating torque with one or both the first and second torque machines 35A and 35B, and transforms mechanical power in a manner suitable for generating electric power with one or both the first and second torque machines 35A and 35B, depending upon torque inputs and operating conditions.

The control module 12 executes control schemes to control operation of the engine 40 in coordination with the inverter module 30 to control overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque to the driveline 60 that is responsive to an operator torque request. This includes controlling operation of the engine 40 to achieve a preferred engine speed associated with a peak or otherwise preferred efficiency.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 12 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
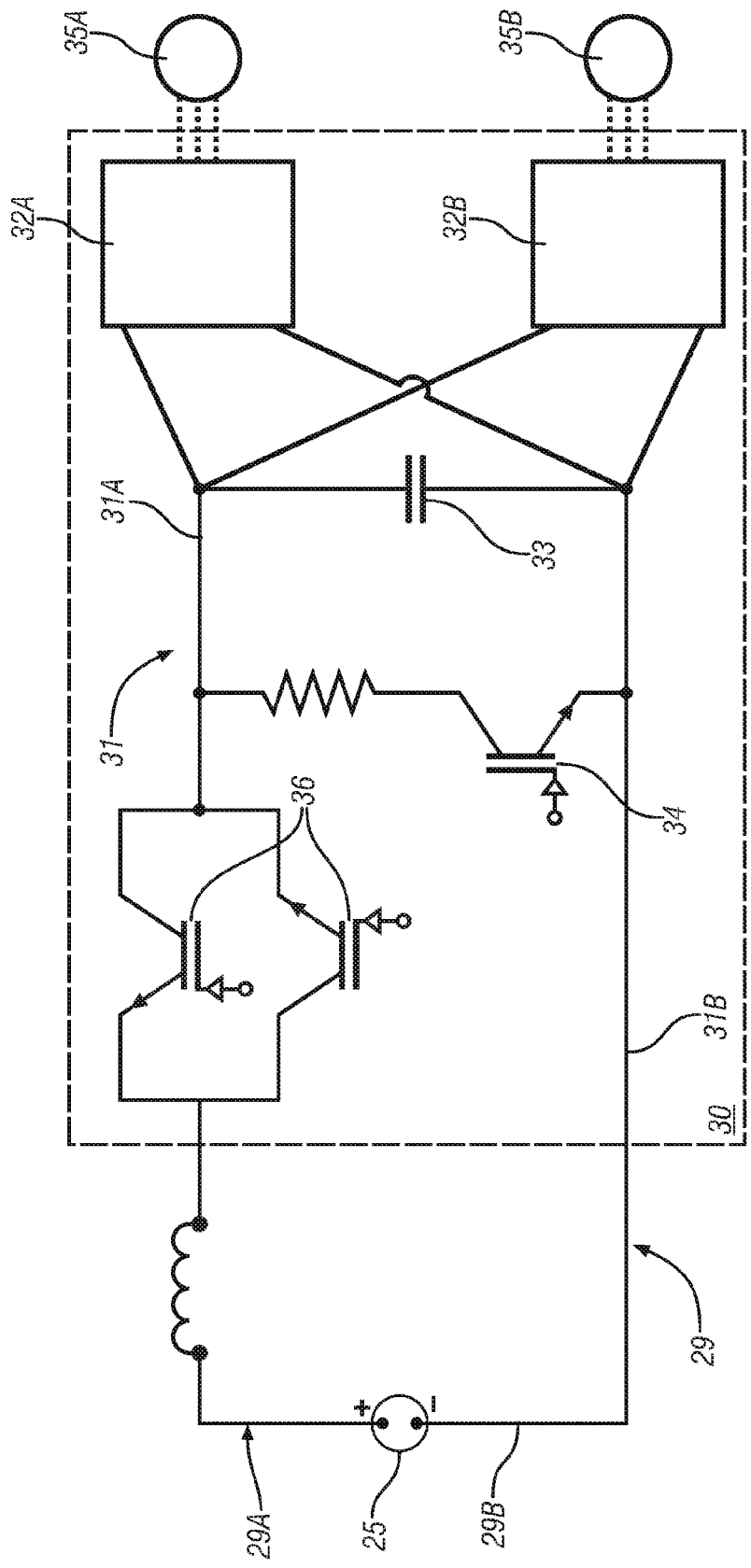
FIG. 2 schematically shows details of an electric circuit of a hybrid powertrain system including a high-voltage battery connected to a high-voltage bus connected to an inverter module and first and second torque machines, in accordance with the present disclosure.

FIG. 2 schematically shows details of an electric circuit including the high-voltage battery 25, high-voltage bus 29 including the positive side 29A and the negative side 29B, the inverter module 30, and the first and second torque machines 35A and 35B. A DC link 31 including positive and negative DC link rails 31A and 31B, respectively, are coupled to both the first and second inverters 32A and 32B. A high-voltage filter capacitor 33 is electrically connected between the positive and negative DC links 31A and 31B, respectively. A controllable discharge switch 34 preferably in series with a resistor element is electrically coupled across the DC link, i.e. between the positive and negative DC link rails 31A and 31B. A switch device 36 is placed between the positive DC link rail 31A and the positive side 29A of the high-voltage bus 29. Negative DC link rail 31B is directly coupled to the negative side 29B of the high-voltage bus. Alternatively, the switch device 36 may be placed between the negative DC link rail 31B and the negative side 29A of the high-voltage bus 29, and the positive DC link rail 31A directly coupled to the positive side 29A of the high-voltage bus. One or both the switch device 36 and the discharge switch 34 is controllable to selectively electrically couple and de-couple the high-voltage bus 29 and DC link 31 as described in further functional detail herein below. The switch device 36 and the discharge switch 34 are electrically connected to and controlled by the control module 12. In one embodiment, the switch device 36 includes a pair of back-to-back power transistors, e.g., IGBT/FWD or MOSFET/FWD devices, connected in parallel to individually control flow of electric current in both directions between the high-voltage battery 25 and the first and second inverters 32A and 32B. Alternatively, the switch device 36 includes a single power transistor, e.g., an IGBT or a MOSFET device, connected in parallel with a forward-biased diode device. Alternatively, the switch device 36 includes a high-speed, high-voltage mechanical switch device.

The voltage potential across the positive and negative DC link rails 31A and 31B across the high-voltage filter capacitor 33 can be used to drive the second torque machine 35B using the second inverter 32B to provide tractive torque to the driveline 60.

The engine 40 can be used to transfer mechanical power to the first torque machine 35A. The first torque machine 35A in conjunction with the first inverter 32A generates electric power using the mechanical power. The generated electric power is transferred to the positive and negative DC link rails 31A and 31B, and from there to either or both the second inverter 32A for powering the second torque machine 35B and the high-voltage bus 29 for charging the high-voltage battery 25, using energy and torque balancing equations.

The control scheme for the powertrain system controls and manages electric power in one of a plurality of operating modes, depending upon magnitude of an operator torque request and a capability for the powertrain system 20 to achieve a torque output that is responsive thereto.

In a first operating mode, the switch device 36 is in a closed state thus clamping the high-voltage bus 29 to the DC link 31, and electric power flows between the high-voltage battery 25 and the first and second inverters 32A and 32B. In the first operating mode, the DC link voltage, i.e., the voltage potential between the positive and negative DC link rails 31A and 31B across the high-voltage filter capacitor 33 is equal to the voltage of the high-voltage battery 25. The motor torque output from the second torque machine 35B is therefore limited to that achievable with the DC link voltage equivalent to the voltage of the high-voltage bus 29 (i.e. the voltage of the high-voltage battery 25). In the first operating mode, there is an electrical energy balance between the high-voltage battery 25, the first torque machine 35A and the second torque machine 35B.

In a second operating mode, the switch device 36 is in an open state thus electrically decoupling the high-voltage bus 29 from the DC link 31, and no electric power flows between the high-voltage battery 25 and the first and second inverters 32A and 32B. In the second operating mode, the DC link voltage, i.e. the voltage potential between the positive and negative DC link rails 31A and 31B, is not limited to the voltage of the high-voltage battery 25. Instead, the voltage potential between the positive and negative DC link rails 31A and 31B across the high-voltage filter capacitor 33 is driven by the voltage from the first inverter 32A based upon input from the first torque machine 35A as driven by the engine 40. Thus the voltage provided to the second inverter 32B by the DC link 31 may be greater that the voltage of the high-voltage battery 25. An equivalent motor torque output from the second torque machine 35B therefore may be achieved at lower motor currents or motor torque output from the second torque machine 35B may be greater at equivalent motor currents. In the second operating mode, there is an energy balance between the first torque machine 35A and the second torque machine 35B.

In a third operating mode, the switch device 36 is cycled between the open state and the closed state, e.g., using a pulsewidth-modulated (PWM) signal with a controllable duty cycle to periodically interrupt electric power flow between the high-voltage battery 25 and the first and second inverters 32A and 32B. In the third operating mode, the DC link voltage, i.e. the voltage potential between the positive and negative DC link rails 31A and 31B, also is not limited to the voltage of the high-voltage battery 25. Instead, the voltage potential between the positive and negative DC link rails 31A and 31B across the high-voltage filter capacitor 33 is driven by the voltage from the first inverter 32A based upon input from the first torque machine 35A as driven by the engine 40 and the duty cycle of the PWM signal to the switch device 36. Thus the voltage provided to the second inverter 32B by the DC link 31 may be greater that the voltage of the high-voltage battery 25. An equivalent motor torque output from the second torque machine 35B therefore may be achieved at lower motor currents or motor torque output from the second torque machine 35B may be greater at equivalent motor currents. The motor torque output from the second torque machine 35B may increase with an increase in the DC link voltage, and may be limited to an upper voltage limit, e.g., 500V DC. In the third operating mode, the energy balance between the first torque machine 35A and the second torque machine 35B is mitigated by a periodic energy balance that includes the high-voltage battery 25.

Figure 3:
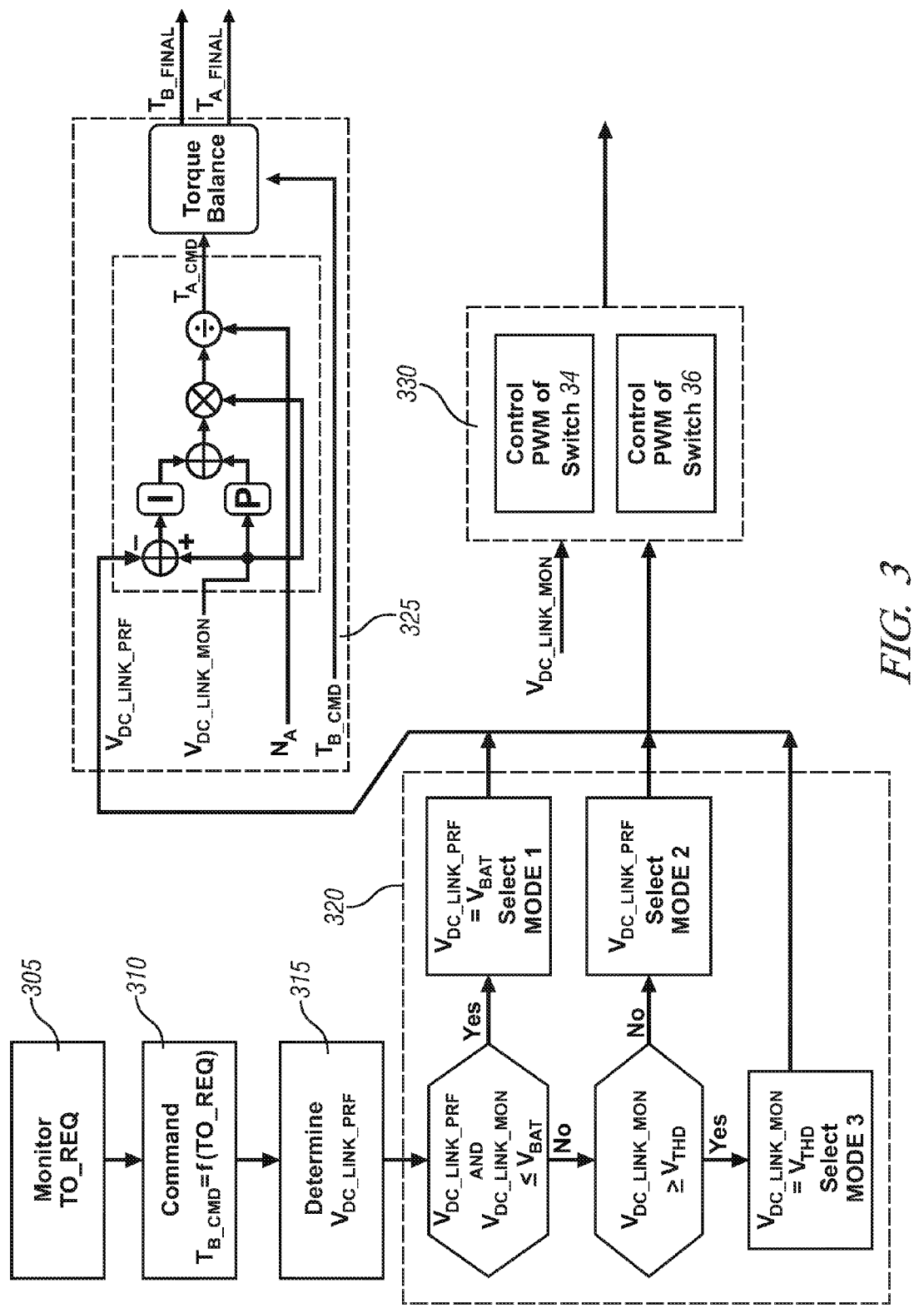
FIG. 3 schematically shows a control scheme for controlling operation of an electric circuit for a hybrid powertrain, in accordance with the present disclosure.

FIG. 3 schematically shows a control scheme for controlling operation of a hybrid powertrain, e.g., the hybrid powertrain 20 described with reference to FIGS. 1 and 2, in response to the operator torque request.

During ongoing operation of the powertrain system, an operator torque request (TO_REQ) is monitored via the operator interface 14 (305).

A motor torque command is provided in response to the operator torque request, preferably taking the form of a motor torque command for the second torque machine 35B that is transferred to the driveline 60 ($T_{B\_CMD}$=f(TO_REQ)) (310).

A preferred DC link voltage ($V_{DC\_LINK\_PRF}$) is determined (315), for example through calculations or reference, and corresponds to the motor torque command for the second torque machine 35B transferred to the driveline 60 ($T_{B\_CMD}$). A preferred DC link voltage may, for example, be determined to minimize the electric machine current required to effect the motor torque command and thereby minimize ohmic heating. Alternatively or in addition, torque generation considerations for second torque machine 35B may be dominant in the determination of preferred DC link voltage. In addition to torque considerations of second torque machine 35B, the preferred DC link voltage ($V_{DC\_LINK\_PRF}$) may also be affected a motor torque command for the first torque machine 35A ($T_{A\_CMD}$) due to electric energy balance considerations and may be determined with such considerations in mind.

The DC link voltage ($V_{DC\_LINK\_MON}$) is ongoingly monitored and corresponds to magnitude of voltage from the high-voltage battery 25 at the high-voltage bus 29 ($V_{BAT}$) when the high-voltage bus 29 is clamped to the DC link (i.e. switch device 36 closed). The DC link voltage ($V_{DC\_LINK\_MON}$) may vary from the voltage from the high-voltage battery 25 at the high-voltage bus 29 ($V_{BAT}$) when the high-voltage bus 29 is not clamped to the DC link (i.e., when the switch device 36 open or controlled using a PWM signal with a controllable duty cycle to periodically interrupt electric power flowing between the high-voltage battery 25).

One of the aforementioned first, second, and third operating modes is selected based upon the preferred DC link voltage ($V_{DC\_LINK\_PRF}$), the monitored DC link voltage ($V_{DC\_LINK\_MON}$) and the magnitude of voltage from the high-voltage battery 25 at the high-voltage bus 29 ($V_{BAT}$) (320). Operation of the powertrain system 20 is controlled in the selected one of the first, second, and third operating modes using the switch device 36 to control the DC link voltage ($V_{DC\_LINK}$) to control electric power flow between the high-voltage battery 25 and the first and second inverters 32A and 32B. Alternatively, operation of the powertrain system 20 is controlled in the selected one of the first, second, and third operating modes using the discharge switch 34 to control the DC link voltage ($V_{DC\_LINK}$) to control electric power flow between the high-voltage battery 25 and the first and second inverters 32A and 32B.

The hybrid powertrain system 20 selects the first operating mode (MODE 1) when the preferred DC link voltage ($V_{DC\_LINK\_PRF}$) and the monitored DC link voltage ($V_{DC\_LINK\_MON}$) are equal to or less than the magnitude of voltage from the high-voltage battery 25 at the high-voltage bus 29 ($V_{BAT}$). The switch device 36 is controlled to the closed state and electric power flows between the high-voltage battery 25 and the first and second inverters 32A and 32B via the positive and negative DC link rails 31A and 31B. In the first operating mode, the preferred DC link voltage ($V_{DC\_LINK\_PRF}$) is set equal to the voltage from the high-voltage battery 25 at the high-voltage bus 29 ($V_{BAT}$).

The hybrid powertrain system 20 operates in the second operating mode (MODE 2) when the preferred DC link voltage ($V_{DC\_LINK\_PRF}$) is greater than the voltage from the high-voltage battery 25 at the high-voltage bus 29 ($V_{BAT}$), and the monitored DC link voltage ($V_{DC\_LINK\_MON}$) is less than an upper voltage limit ($V_{THD}$). The switch device 36 is controlled in the open state to completely interrupt electric power flowing between the high-voltage battery 25 and the first and second inverters 32A and 32B. The monitored voltage potential between the positive and negative DC link rails 31A and 31B across the high-voltage filter capacitor 33, i.e., the monitored DC link voltage ($V_{DC\_LINK\_MON}$), is driven by the voltage from the first inverter 32A based upon input from the first torque machine 35A being driven by the engine 40. Operation in the second operating mode continues so long as the preferred DC link voltage ($V_{DC\_LINK\_PRF}$) is greater than the voltage from the high-voltage battery 25 at the high-voltage bus 29 ($V_{BAT}$), and the monitored DC link voltage ($V_{DC\_LINK\_MON}$) is less than the upper voltage limit ($V_{THD}$), e.g., 500V DC. The upper voltage limit ($V_{THD}$) is associated with design limits and operating capabilities of the various powertrain components, including but not limited to the positive and negative DC link rails 31A and 31B, the first and second inverters 32A and 32B, and the first and second torque machines 35A and 35B. In the second operating mode, the preferred DC link voltage ($V_{DC\_LINK\_PRF}$) is the value previously determined for example through calculations or reference (315).

The hybrid powertrain system 20 operates in the third operating mode (Mode 3) when the monitored DC link voltage ($V_{DC\_LINK\_MON}$) is equal to or greater than the upper voltage limit ($V_{THD}$). Operation in the third operating mode includes controlling the switch device 36 using a PWM signal with a controllable duty cycle to periodically interrupt electric power flowing between the high-voltage battery 25 and the first and second inverters 32A and 32B to decrease the monitored DC link voltage ($V_{DC\_LINK\_MON}$) across the filter capacitor 33. Alternatively, operation in the third operating mode includes controlling the discharge switch 34 using the PWM signal with the controllable duty cycle to periodically discharge electric power across the filter capacitor 33 and the first and second inverters 32A and 32B to decrease the monitored DC link voltage ($V_{DC\_LINK\_MON}$). Alternatively, both the switch device 36 and the discharge switch 34 are controlled using the PWM signal to periodically discharge electric power (330). The monitored voltage potential between the positive and negative DC link rails 31A and 31B across the high-voltage filter capacitor 33, i.e., the monitored DC link voltage ($V_{DC\_LINK\_MON}$), is driven by the voltage from the first inverter 32A based upon input from the first torque machine 35A, which is being driven by the engine 40. Operation in the third operating mode continues so long as the monitored DC link voltage ($V_{DC\_LINK\_MON}$) is greater than the upper voltage limit ($V_{THD}$).

The hybrid powertrain system 20 operates in one of the first, second, and third operating modes to control operation of the first and second first torque machines 35A and 35B in response to the operator torque request (325). A preferred control scheme includes determining the preferred DC link voltage ($V_{DC\_LINK\_PRF}$) and the motor torque command for the second torque machine 35B transferred to the driveline 60 ($T_{B\_CMD}$), as previously described. Monitored states of the hybrid powertrain system 20 include a present rotational speed ($N_A$) of the first torque machine 35A and the monitored DC link voltage ($V_{DC\_LINK\_MON}$). A proportional (P) and integral (I) control logic is executed to determine a motor torque command for the first torque machine 35A ($T_{A\_CMD}$) in response to the present rotational speed ($N_A$) of the first torque machine 35A and a difference between the monitored DC link voltage ($V_{DC\_LINK\_MON}$) and the preferred DC link voltage ($V_{DC\_LINK\_PRF}$). Torque balancing (Torque Balance) is executed between the motor torque command for the first torque machine 35A ($T_{A\_CMD}$) and the motor torque command for the second torque machine 35B ($T_{B\_CMD}$) to determine final motor torque commands for the first and second torque machines 35A and 35B, i.e., $T_{A\_FINAL}$ and $T_{B\_FINAL}$, respectively.

Figure 4:
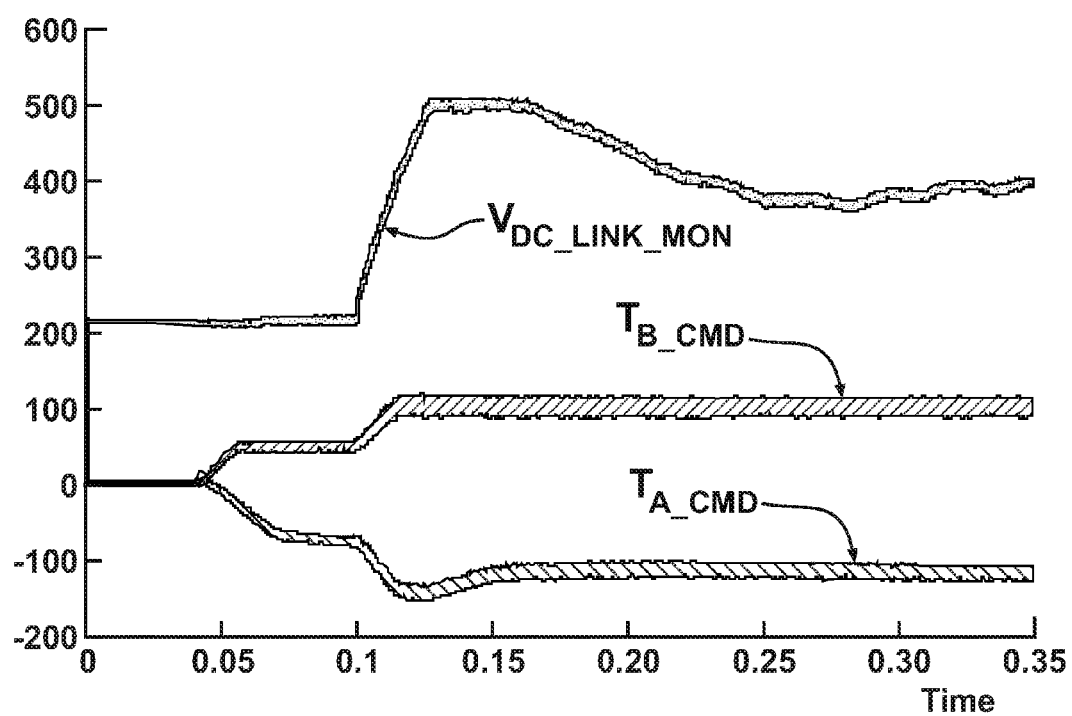
FIG. 4 graphically shows simulated operation of a hybrid powertrain system using the control scheme described with reference to FIG. 3, in accordance with the present disclosure.

FIG. 4 graphically shows simulated operation of the hybrid powertrain system 20 using the control scheme described with reference to FIG. 3, including controlling the switch device 36 to maintain the monitored DC link voltage ($V_{DC\_LINK\_MON}$) at or below the upper voltage limit ($V_{THD}$) and maintaining balanced torque output from the first and second torque machines 35A and 35B respectively.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a hybrid powertrain system including a high-voltage electric circuit comprising a high-voltage battery electrically connected to a high-voltage bus including first and second sides, and a DC link including first and second DC link rails coupled to first and second inverters electrically connected to first and second torque machines, the method comprising:
   receiving a motor torque command for the second torque machine;
   determining a preferred DC link voltage set for achieving the motor torque commanded from the second torque machine; and
   when the preferred DC link voltage is greater than an output voltage of the high-voltage battery:
   selectively decoupling the high-voltage battery and the DC link using a switch device comprising at least one pair of switch elements connected in parallel, wherein no electrical power flows between the high-voltage battery and the DC link when the high-voltage battery and the DC link are decoupled, and
   driving voltage of the DC link to achieve the preferred DC link voltage with voltage solely provided from the first inverter to the second inverter while the high-voltage battery and the DC link are decoupled, the voltage provided from the first inverter is generated using mechanical power transferred from an engine to the first torque machine independent of the output voltage of the high-voltage battery;
   wherein the switch device is placed between the first side of the high-voltage bus and the first DC link rail while the second side of the high-voltage bus is always directly coupled to the second DC link rail, the high-voltage battery and the DC link selectively decoupled by controlling the switch device to decouple the first side of the high-voltage bus from the first DC link rail;
   wherein the first side of the high-voltage bus and the first DC link rail both comprise one of a positive polarity and a negative polarity and the second side of the high-voltage bus and the second DC link rail both comprise the other one of the positive polarity and the negative polarity.

2. The method of claim 1, further comprising:
   periodically coupling and decoupling the high-voltage battery and the DC link when a monitored DC link voltage is greater than a threshold voltage.

3. The method of claim 2, wherein periodically coupling and decoupling the high-voltage battery and the DC link comprises controlling the switch device to selectively couple and decouple the high-voltage battery and the DC link to achieve the preferred DC link voltage.

4. The method of claim 3, wherein controlling the switch device to selectively couple and decouple the high-voltage battery and the DC link comprises executing a pulsewidth-modulated control of the switch device placed between the first side of the high-voltage bus and the first DC link rail to selectively couple and decouple the high-voltage battery and the DC link to achieve the preferred DC link voltage.

5. The method of claim 2, wherein periodically coupling and decoupling the high-voltage battery and the DC link comprises controlling a second switch device coupled across the DC link to selectively couple and decouple the high-voltage battery and the DC link to achieve the preferred DC link voltage.

6. The method of claim 5, wherein controlling the second switch to selectively couple and decouple the high-voltage battery and the DC link comprises executing a pulsewidth-modulated control of the switch coupled across the DC link to selectively couple and decouple the high-voltage battery and the DC link to achieve the preferred DC link voltage.

7. The method of claim 1, further comprising:
   selectively coupling the high-voltage battery and the DC link when the preferred DC link voltage is less than an output voltage of the high-voltage battery.

8. The method of claim 1, further comprising commanding a motor torque output from the first torque machine based on a motor torque output from the second torque machine.

9. Method for operating a hybrid powertrain system including an engine and first and second torque machines coupled to a transmission device to transfer torque to a driveline and a high-voltage electric circuit including a high-voltage battery electrically connected to a high-voltage bus including first and second sides, and a DC link including first and second DC link rails coupled to first and second inverters electrically connected to the first and second torque machines, and a switch configured to decouple the high-voltage battery and the first and second inverters when controlled to an open state, the method comprising:

commanding a motor torque output from the second torque machine in response to an operator torque request;

determining a preferred DC link voltage set to achieve the commanded motor torque output from the second torque machine; and when the preferred DC link voltage is greater than an output voltage of the high-voltage battery:

controlling the switch, comprising at least one pair of switch elements connected in parallel, to selectively decouple the high-voltage battery from the first and second inverters, wherein no electrical power flows between the high-voltage battery and the first and second inverters when the high-voltage battery and the first and second inverters are decoupled, and driving voltage of the DC link to achieve the preferred DC link voltage with voltage solely provided from the first inverter to the second inverter while the high-voltage battery and the first and second inverters are decoupled, the voltage provided from the first inverter is generated using mechanical power transferred from the engine to the first torque machine independent of the output voltage of the high-voltage battery;

wherein the switch is placed between the first side of the high-voltage bus and the first DC link rail while the second side of the high-voltage bus is always directly coupled to the second DC link rail, the high-voltage battery selectively decoupled from the first and second inverters by controlling the switch to decouple the first side of the high-voltage bus from the first DC link rail.

10. The method of claim 9, further comprising:

selectively coupling the high-voltage battery and the first and second inverters by controlling the switch to a closed state when an output voltage of the high-voltage battery is greater than the preferred DC link voltage to achieve the commanded motor torque output from the second torque machine.

11. The method of claim 9, further comprising:

executing pulsewidth-modulated control of the switch when the preferred DC link voltage to achieve the commanded motor torque output from the second torque machine is greater than an output voltage of the high-voltage battery and a monitored DC link voltage is equal to or greater than a threshold voltage.

12. The method of claim 9, wherein the mechanical power transferred from the engine to the first torque machine is responsive to the commanded motor torque output from the second torque machine.

13. The method of claim 12, comprising operating the engine to transfer torque to the first torque machine to achieve the commanded motor torque output from the first torque machine responsive to the commanded motor torque output from the second torque machine.

14. A hybrid powertrain system, comprising an engine and first and second torque machines coupled to a transmission to transfer torque to a driveline;

a high-voltage electric circuit comprising a high-voltage battery electrically connected to a high-voltage bus including first and second sides, an inverter module, and a switch comprising at least one pair of switch elements connected in parallel, the high-voltage battery electrically connected via first and second DC link rails of a DC link to the inverter module, the inverter module electrically operatively connected to the first and second torque machines, and the switch configured to decouple the high-voltage battery and the inverter module when controlled to an open state wherein no electrical power flows between the high-voltage battery and the inverter module when the high-voltage battery and the inverter module are decoupled; and a controller monitoring an output voltage of the high-voltage battery and a voltage across the DC link, determining a preferred voltage across the DC link set for achieving a motor torque commanded from the second torque machine, and when the preferred voltage across the DC link is greater than the output voltage of the high-voltage battery:

controlling the switch to selectively decouple the high-voltage battery and the inverter module, and driving voltage of the DC link to achieve the preferred voltage across the DC link with voltage solely provided from the first torque machine to the second torque machine while the high-voltage battery and the inverter module are decoupled, the voltage provided from the first torque machine is generated using mechanical power transferred from the engine independent of the output voltage of the high-voltage battery;

wherein the switch device is placed between the first side of the high-voltage bus and the first DC link rail while the second side of the high-voltage bus is always directly coupled to the second DC link rail, the high-voltage battery and the inverter module selectively decoupled by controlling the switch device to decouple the first side of the high-voltage bus from the first DC link rail;

wherein the first side of the high-voltage bus and the first DC link rail both comprise one of a positive polarity and a negative polarity and the second side of the high-voltage bus and the second DC link rail both comprise the other one of the positive polarity and the negative polarity.

15. The hybrid powertrain system of claim 14, wherein a second switch is electrically coupled across the DC link.

16. The hybrid powertrain system of claim 14, further comprises executing pulsewidth-modulated control of the switch to selectively couple and decouple the high-voltage battery and the inverter module in response to the voltage of the high-voltage battery when the voltage across the DC link exceeds a threshold.

* * * * *